Dec. 19, 1967  E. E. SUTTON ETAL  3,358,584
FOOD COOKING DEVICE

Filed Jan. 26, 1966

INVENTORS.
EARL E. SUTTON &
TERRY M. BRAIN
BY

ATTORNEYS.

Dec. 19, 1967  E. E. SUTTON ETAL  3,358,584
FOOD COOKING DEVICE
Filed Jan. 26, 1966  4 Sheets-Sheet 3

INVENTORS.
EARL E. SUTTON &
TERRY M. BRAIN
BY
ATTORNEYS.

Dec. 19, 1967   E. E. SUTTON ETAL   3,358,584
FOOD COOKING DEVICE
Filed Jan. 26, 1966   4 Sheets-Sheet 4

INVENTORS.
EARL E. SUTTON
BY TERRY M. BRAIN

ATTORNEYS.

_United States Patent Office_

3,358,584
Patented Dec. 19, 1967

3,358,584
FOOD COOKING DEVICE
Earl E. Sutton and Terry M. Brain, Mansfield, Ohio, assignors to Dominion Electric Corporation, a corporation of Ohio
Filed Jan. 26, 1966, Ser. No. 523,221
40 Claims. (Cl. 99—329)

ABSTRACT OF THE DISCLOSURE

A cooking device such as a toaster for bread or the like having temperature sensing means for sensing the temperature of the bread or the like being toasted, magnetic means for retaining the rack and supporting the bread or the like in toasting position, electric relay means controlled by the electric resistance of the temperature sensing means for releasing the magnetic means to allow the rack to move to non-toasting position and to de-energize the heating element of the toaster upon the temperature sensing means sensing a required temperature of the bread or the like, adjusting means for adjusting the condition under which the electric relay means will operate to release the magnetic means in response to the temperature sensed by the temperature sensing means, guard means for holding and clamping the bread or the like in the toaster slot and movable relative to the slot, the guard means carrying the sensing means toward and away from the bread or the like, and some alternate means for moving the guard means toward and away from the bread or the like, such as manually operable mechanism, such as solenoid operable means connected to the toaster circuit, and such as a camming-and-spring mechanism responsive to vertical movement of the rack.

---

Our invention relates to food cooking devices and particularly to electric toasters for bread and the like.

In the description of our invention, the same will be described in connection with a bread toaster as being particularly adapted for each use, but it will be appreciated that the invention and features thereof are adapted for other cooking devices and for cooking and toasting other foods than bread.

An object of our invention is to provide a food toaster controlled by the temperature of or at the food being toasted.

Another object is the provision for controlling the operation of a toaster in accordance with the temperature of the food or very closely adjacent or proximate to the food being toasted.

Another object is to provide for improved control of the heating of food, such as bread, being subjected to heat generated by electrical resistance.

Another object is the provision for controlling the cooking or toasting cycle in accordance with preselected temperature of such food.

Another object is obtaining a toasting of bread or the like with greater speed than heretofore obtainable with the same or comparable amount of electrical energy.

Another object is the making of toasted bread or the like in which the toasting or browning of the exposed surface of the bread or the like is better and more evenly distributed.

Another object is the toasting of bread or the like to a more precise degree of toasting or browning desired.

Another object is the provision of novel mechanism and control apparatus for a food cooking device, such as a bread toaster.

Another object is the provision of improved results with a unique structural arrangement and electrical control system in a food cooking device such as a bread toaster.

Other objects and a fuller understanding of our invention may be had by referring to the following description and claims, taken in conjunction with the accompanying drawings, in which:

Figure 1:
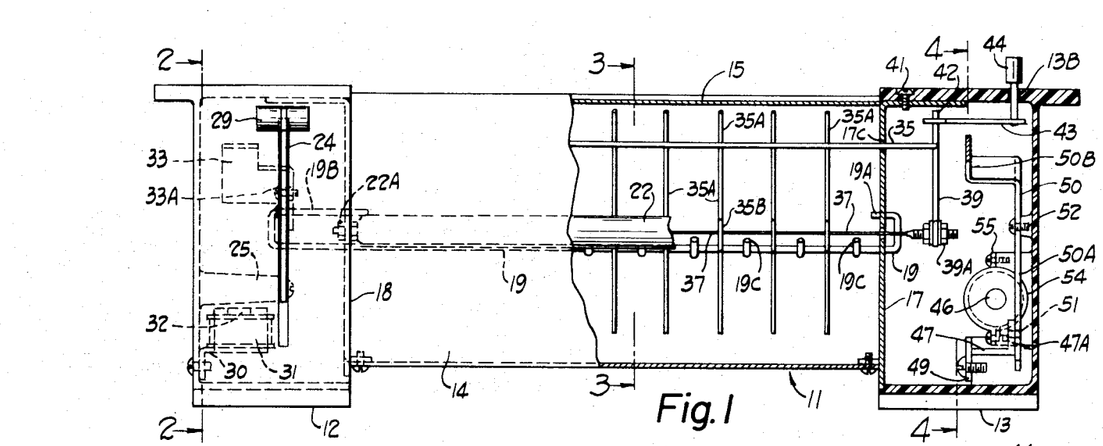
FIGURE 1 is a side view partially in section of an electrically heated bread toaster embodying a preferred form of our invention.

Our improved toaster has a housing indicated generally by the reference character 11, of which a side view is shown in FIGURE 1. This housing 11 has one end member 12 positioned at one end and another end member 13 positioned at the opposite end. The end members 12 and 13 are preferably made of a molded plastic material which is both heat-insulating and electrical-insulating in character. Joining the spaced end members 12 and 13 is a metal shell 14. The metal shell 14 has side walls generally hyperbolic in cross-sectional shape. The inner surface of the side walls of shell 14 are as close to being hyperbolic as possible with due regard for the position of the tubular electrical resistance members 22 and 23 intermediate the top and bottom of the side walls as illustrated, and also with due regard to the practical dimensions permitted in such a toaster. The inner surfaces of the side walls of the shell 14 are highly reflective so as to reflect infrared energy emitted from heating elements 22 and 23 inwardly of the shell. The lower ends of the side walls of the shell 14 are enclosed, except for a bottom opening (not shown) for the escape or discharge of crumbs therefrom.

Figures 3, 4:
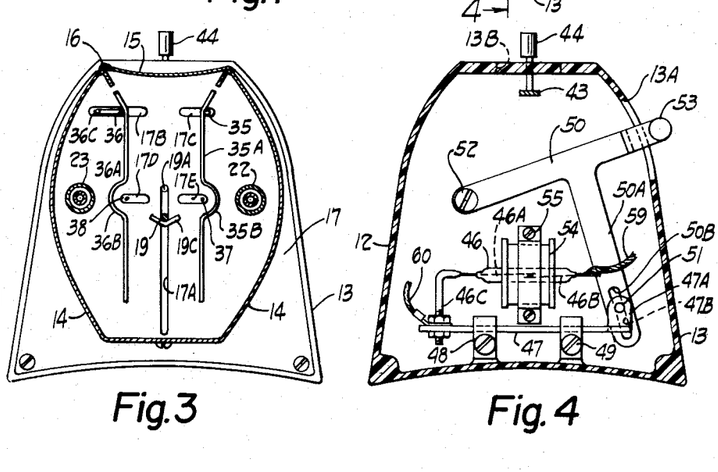
FIGURE 3 is a cross-sectional view taken through the line 3—3 of FIGURE 1.
FIGURE 4 is a cross-sectional view taken through the line 4—4 of FIGURE 1.

The top of the shell member 14 is open for the insertion of slices of bread down into the toaster intermediate the side walls of the shell, that is, into the well of the toaster. In the form shown, the toaster has room for two slices of bread arranged in tandem or alignment with opposite sides of each slice of bread exposed to infrared rays from the tubular electrical resistance elements 22 and 23. A cover 15 is hingedly connected by a hinge element 16 to the spaced end members 12 and 13. When the toaster is not in use, the cover 15 may be swung downwardly in horizontal position as illustrated in FIGURE 3 so as to cover and enclose the top of the toaster and to keep dust and the like from entering the toaster. When the toaster is used, then the cover is swung upwardly and back on the hinge 16 so as to hang downwardly outside of the shell 14.

Carried by the end members 12 and 13 are upright supporting panels 17 and 18, upright supporting panel 18 being carried by end member 12 and upright supporting panel 17 being carried by end member 13. The space between the panel members 17 and 18 and intermediate of the side walls of shell 14 provides the enclosure for the toasting or cooking operation. The elements 22 and 23 are sufficiently long as to extend substantially the length of the toaster between the panels 17 and 18 and thus extend to or beyond the limits of the slices of bread in the toaster so as to assure full toasting treatment thereof.

The toaster has a bread-supporting rack 19 extending longitudinally thereof between panel members 17 and 18 and intermediate the side walls of shell 14. This rack 19 has a plurality of short cross-beams 19C disposed as shown for supporting the slices of bread thereon. The rack 19 has opposite bent end portions 19A and 19B provided for preventing rotation of the rack 19, that is, to assure against lateral tipping or rotation of the rack on its axis. The end portions of the longitudinal bar extending along rack 19 extend through vertical slots 17A and 18A in the panels 17 and 18. These aligned slots permit the rack member to move vertically upwardly and downwardly and also by accommodating the bent end portions 19A and 19B simultaneously prevent rotation of the rack member.

The tubular electrical resistance elements 22 and 23 are of the quartz or vicor type, wherein a resistive wire is in the tube, which wire is resistant to electricity passing therethrough and which is so composed and constructed as to emit infrared energy therefrom around the circumferential extent of each tube and along the length thereof. Element 22 is secured by fastening means 22A to the panels 17 and 18 and element 23 is secured by fastening means 23A to panels 17 and 18 whereby the tubular elements 22 and 23 are mountetd parallel to each other in a common horizontal plane and at the center of the hyperbolic curves in which the side walls of the shell 14 are contoured.

Figure 2:
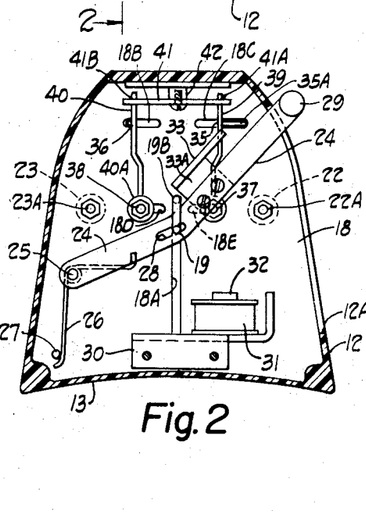
FIGURE 2 is a cross-sectional view taken through the line 2—2 of FIGURE 1.
Figure 5:
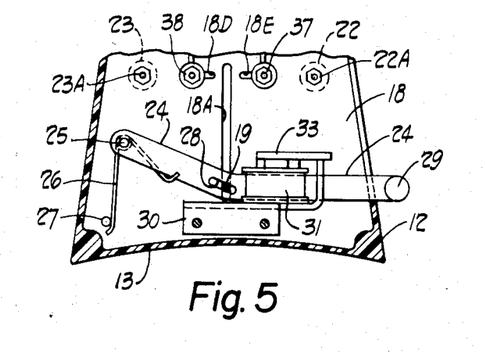
FIGURE 5 is a view somewhat similar to that of FIGURE 2 and showing the bread rack and release mechanism in their downward toasting position whereas the rack and release mechanism are shown in their upward or non-toasting position in FIGURE 2.

Mounted within the end member 12 is a pivoted arm member 24. The arm member 24 is pivotally carried by the pivot support 25 so as to swing in an arc thereon, the arc being in an upright plane. A torsion spring 26 bearing on a pivot support 25 intermediate its ends, and also bearing on the arm 24 and on an abutment 27 as illustrated in FIGURE 2, resiliently urges the arm member 24 upwardly to the position shown in FIGURE 2. However, the resiliency of spring 26 may be overcome so as to permit the arm 24 to be manually swung downwardly to the position illustrated in FIGURE 5. On the free end of the arm member 24, there is a handle 29 disposed outwardly of the end member 12 in a position to be manually seized and moved upwardly or downwardly by the operator. The arm member 24 extends through a longitudinal slit 12A formed in the side of the end member 12. Intermediate of the ends of the arm member 24 there is a slot 28 through which extends an end of rack 19 whereby raising and lowering of the arm member 24 in an arc also raises and lowers the rack 19 in a vertical plane. As the spring 26 urges the arm member 24 upwardly, it also resiliently urges the rack member 19 upwardly.

Mounted upon the end member 12 by means of an electrically insulated bracket support 30 is a release mechanism which is made up of a permanent magnet 32 encircled or surrounded concentrically by an electric coil 31. The face of the magnet 32 is disposed horizontally and directly upwardly. Carried upon the arm member 24 is an armature or soft iron keeper 33, the armature 33 being secured by a supporting bracket 33A bolted or otherwise secured to the arm member 24 as illustrated. The armature 33 is such as to be magnetically attracted to the magnet 32 and upon the arm member 24 being swung downwardly to its position shown in FIGURE 5, the magnetism of the magnet 32 magnetically retains the armature 33 in its downward position and hence holds the arm member 24 in its downward position, which in turn holds the rack 19 in its downward position. The polarity and magnetic strength of the magnet 32 are such as to firmly hold the armature 33 downwardly in contact with the magnet 32 against the bias of spring 26 otherwise urging the armature 33 on the arm member 24 upwardly. Although we prefer and show a permanent magnet, it is to be understood that the magnet 32 may be an electromagnet energized in a suitable and in a well-known manner from electric current which is supplied to the toaster, such as for the electrical heating of the bread.

The electric coil 31 is so disposed around the magnet 32 that upon the rectified electrical energization of the coil 31, the flux set up by the coil 31 overcomes or cancels out the magnetism of the magnet 32, or goes beyond the mere canceling out of the magnetism of the magnet 32 so as to reverse the polarity of the magnet 32. Thus, upon electrical energization of the coil 31, the magnet 32 no longer magnetically attracts and holds the armature 33 and so allows it to rise upwardly away from the magnet 32 in response to the resilient bias of the spring 26. Thus, also, the retention and release of the arm member 24, and hence of the rack 19, is dependent upon the energization and de-energization of the coil 31. The arm member 24 may also be manually raised by sufficient force to overcome the magnetic attraction of the magnet 32.

Disposed on opposite sides of the rack 19 upon which the bread slices are supported are side guard members 35 and 36. These side guard members 35 and 36 are so disposed to be on the opposite sides of the parallel cut surfaces of the bread slices in the toaster, guard member 35 being on one side of a slice of bread and guard member 36 being on the other side of the slice of bread. These guard members 35 and 36 are made up of two parallel horizontal bars from which depend and vertically extend a plurality of rigidly attached upright portions. Attached to guard member 35 are a plurality of spaced upright portions 35A and attached to guard member 36 are a plurality of spaced upright portions 36A. The bond between the upright portions and the horizontal bars is such as to make a rigid interconnection therebetween. Intermediate the upper and lower ends of the upright portions 35A are bowed-out portions 36B. Also intermediate the upper and lower ends of the guard portions 36A are bowed-out portions 36B, as illustrated.

Rigidly connected to the opposite ends of the horizontal bar of guard member 35 are a pair of spaced upright supporting members 39. Rigidly joining the opposite ends of the horizontal bar of guard member 36 are spaced upright supporting members 40. The lower ends of the two upright supporting members 39 carry insulation mountings 39A which secure thereto a sensor wire 37 in such a manner as to hold said sensor wire 37 in a generally taut position and in a horizontal plane insulated from the guard member. The bowed-out portions 35B of guard member 35 accommodate the sensor wire 37 by extending therearound and out of contact with the wire 37. Carried by the lower ends of the upright supporting members 40 are mountings 40A which secure thereto a sensor wire 38 in such manner as to hold the said sensor wire 38 generally taut and in a horizontal plane. Again, the bowed-out portions 36B of guard member 36 accommodate the sensor wire 38 so as to be out of electrical contact therewith. In general, the sensor wires 37 and 38 are in the planes of the upright portions 35A and 36B, respectively, and are so arranged as to be in contact with or in very close proximity with the opposite surfaces of a slice of bread embraced by the guard members 35 and 36 when the guard members are moved bodily inward against or in very close proximity with the sides of the slices of bread. The sensor wires are so disposed as to assume or take on substantially the same temperature as the bread or the surface thereof being toasted between the guard members embracing the bread.

The upper ends of the supporting members 39 and 40 extend upwardly from the plane of the horizontal bars of guard members 35 and 36 and these upwardly protruding portions of supporting members 39 and 40 at each end of the toaster are joined by crossbars 41. The interconnection of the supporting members 39 and 40 with the crossbars 41 is such as to provide pivot connections 41A and 41B at the point of interconnection. It is thus seen in the drawings that the two guard members 35 and 36 with their opposite ends joined by the crossbars 41 form parallelograms. The horizontal bars of the guard members 35 and 36 are slightly bowed upwardly so as to maintain the sensor wires 37 and 38 under tension and hence straight even when the wires are expanded by heat.

Figure 6:
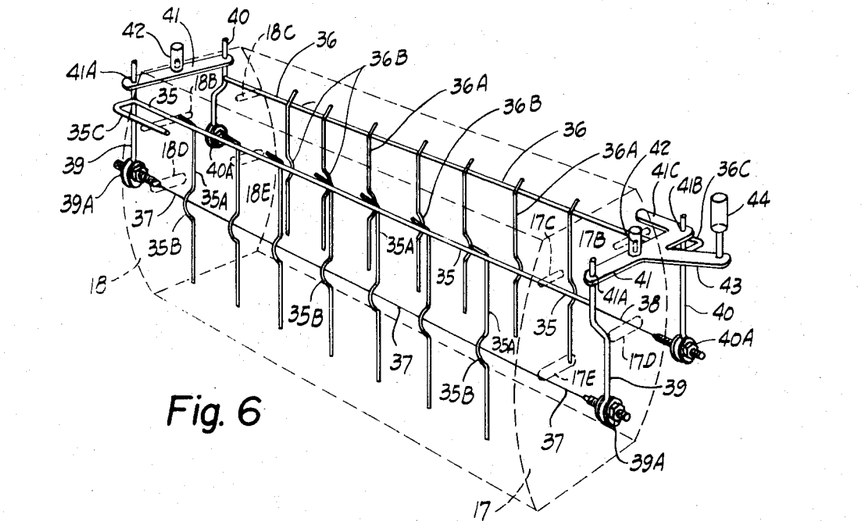
FIGURE 6 is a perspective view of the inner parts of the device shown in FIGURE 1 partially in phantom for better illustrating the arrangement of the parts.
Figure 7:
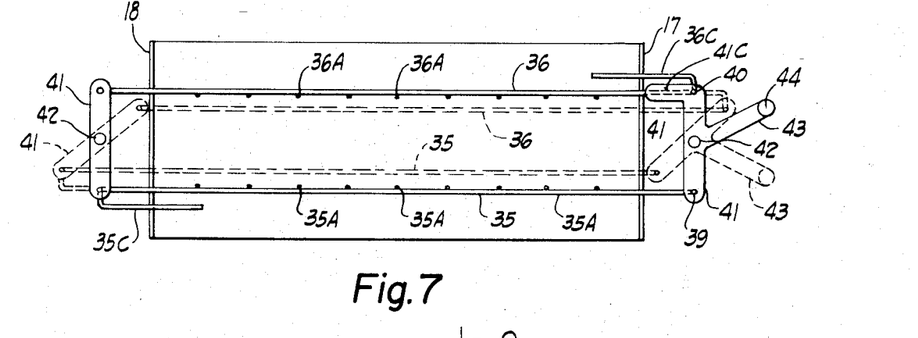
FIGURE 7 is a top plan view looking down on the view shown in FIGURE 6.
Figure 8:
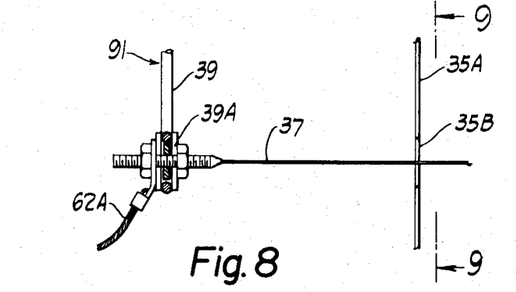
FIGURE 8 is an enlarged fragmentary view showing the mounting of one of the sensor wires utilized in our device.
Figure 9:
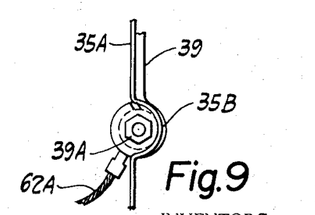
FIGURE 9 is an end view looking in the direction of the arrows 9—9 of FIGURE 8.

The crossbars 41 are pivotally connected and supported intermediate their ends by pivot supports 42 carried by the upper wall of the end members 12 and 13. By the swinging of the crossbars 41 upon pivot supports 42, the guard members 35 and 36 are simultaneously moved toward each other or away from each other in accordance with the angular disposition of the crossbars 41. One of the crossbars 41, which is at the right in FIGURES 1, 6 and 7, is modified from the crossbar 41 on the left in that there is an actuating portion 43 extending angularly therefrom. Protruding upwardly from the free end of the actuating portion 43 is a handle 44 which protrudes upwardly from the end member 13 through an arcuate slot 13B formed therein. By swinging the handle 44 in an arc between the two positions illustrated in FIGURE 7, the guard members 35 and 36 may be moved between the two extreme positions illustrated and in intermediate positions as desired. Thus, the guard members may be moved against or in very close proximity to the opposite sides of a slice of bread, the degree of movement required for this depending upon the thickness thereof. At the same time, the sensor wires 37 and 38 carried by the supporting members 39 and 40 of the respective guard members are moved with the guard members toward and away from the opposite sides of a slice of bread in the toaster. By the arrangement illustrated and described, the sensor wires may be so disposed as to assume or take on the same or approximately the same temperature as the slice of bread at the surface thereof as the sensor wires are either in engagement with the cut bread surface or in very close proximity therewith upon the guard members being moved inwardly against the bread on opposite sides thereof. The same right-hand crossbar 41 has a stop portion 41C extending therefrom for limiting movement of the said crossbar.

To accommodate the sensor wires 37 and 38 and to permit their movement in a horizontal plane toward and away from the bread, slots 17E and 17D are formed in panel member 17, and slots 18E and 18D are formed in panel member 18. Also to accommodate movement of the horizontal bars of guard members 35 and 36 in a horizontal plane toward and away from the bread, slots 17B and 17C are provided in panel member 17, and slots 18B and 18C are provided in panel member 18. The guard member 35 has a bent-over portion 35C in slot 18B to prevent rotation of guard member 35, and guard member 36 has a bent-over portion 36C in slot 17B of panel member 17 to prevent rotation of guard member 36.

Mounted within the end member 13 is a reed switch 46, which reed switch has one contact leaf 46A and another contact leaf 46B encased in a glass envelope or tube. The contact leaves 46A and 46B are resiliently biased away from each other so as to be in a normally open position, that is, in a position so as not to pass current therethrough. The contact leaves 46A and 46B or portions thereof are magnetic material responsive so that they may flex or bend in response to magnetic attraction or repulsion. Thus, movement of the contact leaves 46A and 46B may be magnetically controlled from without the glass envelope around the switch 46. The switch 46 is mounted by means of a switch mounting 46C to a bracket member 47. The bracket member 47 is slidably carried in slide supports 48 and 49 whereby sliding movement of the bracket 47 on the supports 48 and 49, that is, between right and left as shown in FIGURE 4, causes the switch 46 to be simultaneously moved with it between right and left in that figure. In other words, movement of the bracket 47 laterally of the toaster also moves the switch 46 laterally of the toaster. At one end of the bracket 47 there is an upright ear portion 47A having slot 47B therein utilized for obtaining the desired movement of the bracket 47 slidably upon the support 48.

Pivotally mounted upon the end member 13 by means of a pivot support 52 is swingable arm member 50 so disposed as to extend outwardly of the member 13 through a longitudinal slot 13A. A handle 53 is carried on the free end of the arm member 50 so as to be seized by the operator and manually moved upwardly and downwardly to desired position. The arm member 50 has a slotted portion 50A extending downwardly and angularly thereto as seen in FIGURE 4. The slot 50B in the slotted portion 50A accommodates a pin 51 which also is accommodated in a slot 47B in arm portion 47A of bracket 47. The arangement is such that swinging of the handle 53 upwardly and downwardly in a vertical plane causes the bracket 47 to be slidably moved laterally of the toaster, that is, between right and left in FIGURE 4, which movement in turn moves the switch 46 between limits in a straight line laterally of the toaster. The interconnection of the pin 51 in the slots of portions 50A and 47A provide for this translation of movement of arm member 50 to movement of bracket 47 and hence movement of switch 46.

Encircling and disposed around switch 46 is an electric coil 54 which is mounted to the end member 13 by means of mounting 55. The disposition of the parts is such that the coil 54 is concentric of the switch 46 and also the switch 46 may be freely moved axially of the coil 54 through the central opening therein. The opposite ends of the switch 46 are electrically connected by means of flexible electric cables or wires 59 and 60 so that the switch 46 may be freely moved between its limits of movement without restraint from the cables or wires 59 and 60. It is understood, of course, that the wires 59 and 60 are electrically insulated from the bracket 47 so that the switch 46 may be freely moved with the bracket 47 while in electrical interconnection with the wires 59 and 60 but electrically insulated from the support given by bracket 47 and slide supports 48 and 49.

The sensor wires 37 and 38 are relatively fine or thin and preferably of nickel alloy and have the characteristic of having a relatively high resistance to flow of electricity therethrough at relatively high temperatures (such as the temperature of bread upon being fully toasted) and have a relatively low resistance to flow of electricity therethrough at low temperatures (such as room temperature of the temperature of bread before reaching full toasting temperature). The amount of flow of current through the sensor wires 37 and 38 is progressively dependent upon the temperature of said wires 37 and 38. Both the material of the wires and the dimensions of wires 37 and 38, including the cross-section thereof and the length thereof, affect how much the flow of electric current therethrough is modified by the temperature of the sensor wires. We select sensor wires of material and dimension at which the flow of current is relatively high and without much resistance thereto when the wires 37 and 38 are at room temperature or at the temperature of bread prior to toasting or in the initial stages of being toasted. The electrical resistance of the coil 54 is so selected by choice of material and dimensions, including cross-sectional area and length, that the resistance through the coil 54 is relatively high at room temperature, that is, the resistance is higher through the coil 54 at room temperature than through sensor wires 37 and 38. The coil 54 is preferably composed of copper wire. Preferably the resistance of the coil 54 is on the order of about ten times higher than the resistance of the sensor wires 37 and 38, respectively, at 72° F. Thus, current is biased to flow through the sensor wires 37 and 38 at room temperature or at the low initial temperatures of the toasting operation.

Figure 10:
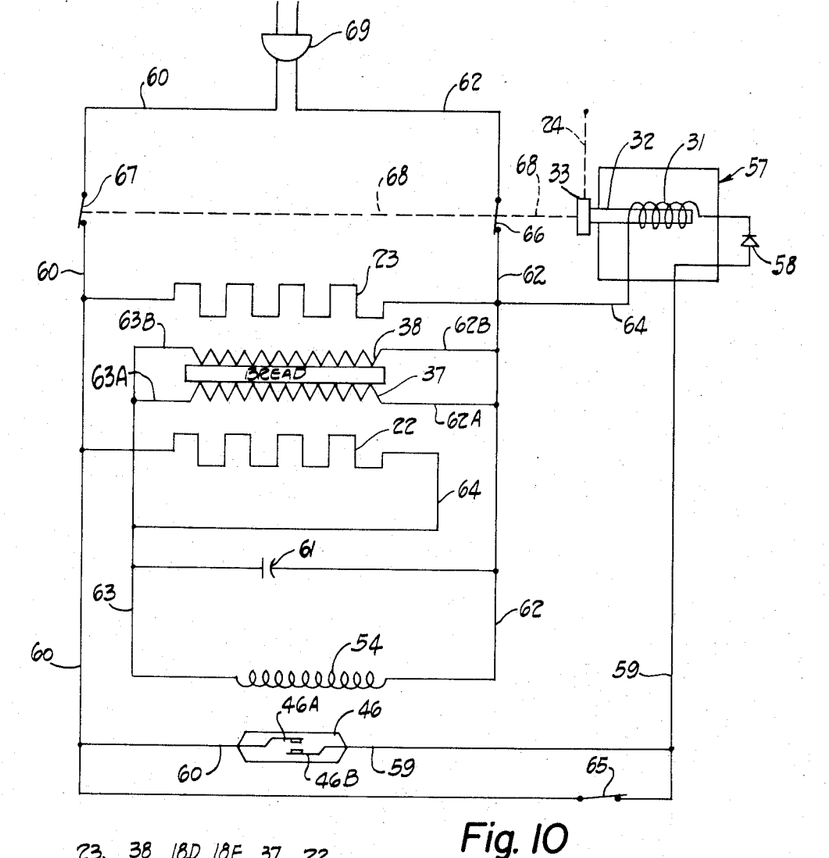
FIGURE 10 is a diagrammatic wiring circuit showing the electrical connections and arrangement of the device illustrated in FIGURE 1.

The electrical circuit of the preferred form of our toaster is diagrammatically illustrated in FIGURE 10. A connecting plug 69 is adapted to be connected to a suitable source of electrical energy, such as to the usual AC power line of a house. The current from the connecting plug or terminal 69 is carried by electric wires 60 and 62 to the opposite end of the respective tubular electrical resistance element 23 and through sensor wires 37 and 38 to the ends of resistance element 22 as shown. Switches 66 and 67 in wires 62 and 60, respectively, control the flow of current through these lines from the plug or terminal 69 to the heating elements and to the other electrical parts of the toaster. The sensor wires 37 and 38 are connected in series with resistance wire 22 as shown and also are interconnected with coil 54 through the wires 62 and 63 as illustrated in FIGURE 10, so as to provide alternate routes for electric current to flow, either through sensor wires 37 and 38 or through coil 54. The relative resistances of the sensor wires 37 and 38 and of the coil 54 are such that at room temperature or at low initial temperatures of the toasting operation, the current or most of the current flows through sensor wires 37 and 38 and none or very little current flows through coil 54. However, as the temperature of the sensor wires 37 and 38 increases, the current is increasingly biased so as to flow through coil 54 in preference to flowing through sensor wires 37 and 38. Thus, the magnitude of the current flow through coil 54 is dependent upon the temperature of sensor wires 37 and 38. Interconnecting wires 62 and 63 is a capacitor 61 located as illustrated.

The magnetic influence of the coil 54 upon the switch 46 is dependent upon the magnitude of the current flow through the coil 54 and also upon the relative axial position of the switch 46 with respect to the coil 54. The magnetic influence upon the switch 46 so as to interengage the contact leaves 46A and 46B is modified by the extent to which the switch 46 is in the most intense magnetic field of coil 54 or is moved farther away therefrom. Thus, the point at which contact is made by the contact leaves 46A and 46B can be modified by moving the switch 46 axially of the coil 54 toward and away therefrom by means of the sliding movement of the bracket 47 described in connection with FIGURE 4.

The release mechanism indicated generally by the reference character 57 in FIGURE 10 includes the magnet 32 encircled by the electric coil 31. A rectifier 58 is connected in the wire 59 so as to cause only direct current to flow through the coil 31 upon energization of the circuit. One end of the coil 31 is electrically connected with the wire 59 through the rectifier 58 and the other end of the coil 31 is electrically connected through a wire 64 to the wire 62. The armature or keeper 33 is positioned to be magnetically attracted and retained in position by the magnet 32 when the magnet 32 is so polarized or energized as to have magnetic attraction at the end facing the armature 33. The armature 33 is shown diagrammatically as being carried on the swingable arm 24. A mechanical linkage 68, shown by broken lines in FIGURE 10, operatively interconnects the armature 33 and arm 24 with the two switches 66 and 67 so that the switches 66 and 67 are in their closed position when the armature 33 is in its downward position shown in FIGURE 5 and which is the relative position illustrated diagrammatically in FIGURE 10. Thus, when the rack 19 is downward in toasting position and with the armature 33 retained downwardly by the magnet 32, the switches 66 and 67 are closed and current flows through the circuit, including the heating elements 22 and 23. However, upon the raising of the arm 24 and the upward movement of the armature 33, the switches 66 and 67 are simultaneously opened so as to de-energize the circuit including the heating elements. To manually energize the coil 31 and thus to change the polarity or the magnetic energization of the magnet 32, a manually operable switch 65 connected to by-pass switch 46 may be manually closed to cause current to flow through the coil 31 even though switch 46 may then be open.

To operate the toaster, the cut slices of bread may be dropped down through the open top of the toaster with the cover 15 swung back out of the way into the well of the toaster. The handle 29 is moved downwardly so as to cause the armature 33 to engage the magnet 32 and simultaneously to close the switches 66 and 67. Current then flows through the heating elements 22 and 23 to energize the same and as the sensor wires 37 and 38 are at a relatively low temperature, this causes the current to flow through those sensor wires rather than through the coil 54. To preselect or govern the point at which the energization of the coil 54 will cause the switch 46 to close and thus to automatically energize the coil 31, the position of the switch 46 relative to the coil 54 is adjusted by manipulation of the handle 53. It is understood, of course, that instead of changing the position of the switch 46 relative to the coil 54, the reverse may be effected by having the switch 46 mounted in a stationary position and by shifting or moving the coil 54 axially along the switch 46. Upon the relative position of the coil 54 and switch 46 being thus determined by the manipulation of handle 53, the toasting of the bread then down in toasting position within the toaster proceeds. Upon the temperature of the bread at its cut surfaces, then engaging the sensor wires 37 and 38 or in such very close proximity therewith as to have substantially the same temperature as the sensor wires 37 and 38, reaching a predetermined degree of temperature, then the flow of current is biased away from the sensor wires 37 and 38 to the coil 54. The resultant energization of the coil 54 sets up a magnetic flux which causes the actuation of the switch 46 at a point dependent upon the relative positions of switch 46 and coil 54 along their common axis. Upon coil 54 closing the switch 46, then the coil 31 about or encircling the magnet 32 is energized and this cancels the magnetic attraction of the magnet 32 by either completely de-energizing the same or by changing its polarity. The loss of magnetic attraction of the magnet 32 causes the armature 33 to swing upwardly on the arm 24 under the bias of spring 26. This raises the rack 19 from its lower or toasting position to its upper or non-toasting position and at the same time opens the switches 66 and 67 through the linkage 68. The bread at this termination of the toasting cycle has been toasted to the desired degree and may be removed from the toaster. The degree of toasting or browning of the bread may be closely regulated by changing the relative position of switch 46 and coil 54 by means of the handle 53. Those who prefer well browned toast will so set the handle 53 as to delay the closing of switch 46 by energization of coil 54 until the surface of the bread being toasted has reached a relatively high degree of temperature. Those desiring less browning of the toast will so adjust the position of the handle 53 and thus the point at which the switch 46 is closed by energization of coil 54 at a relatively lower range of temperature. Thus fine degrees of browning of the toast may be obtained by the setting of the control to handle 53.

To be distinguished from the above described structure, function and result are prior toasters in which the toasting cycle is controlled by a timer, or by a thermostatically controlled switch dependent upon the then existing temperature at a location within the toaster structure but remote from the bread or food being toasted and subjected largely to residual heat from previous toasting operation and to other heat sources. The limitations and disadvantages of those prior toasters are well known, and they emphasize the importance and novelty of the present invention.

Figure 11:
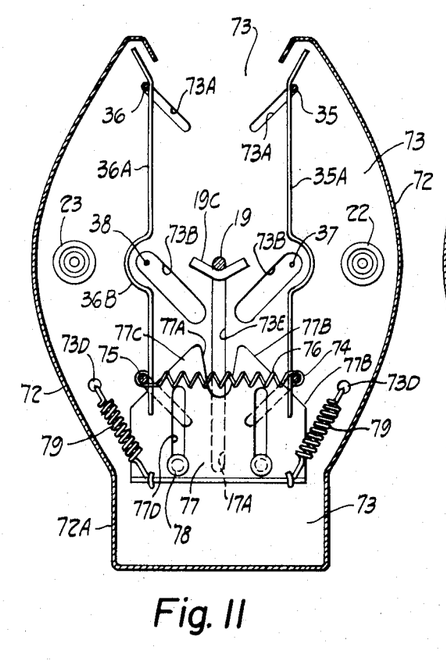
FIGURE 11 is a cross-sectional view of a modified form of toaster and showing the bread rack in its upper or non-toasting position.
Figure 12:
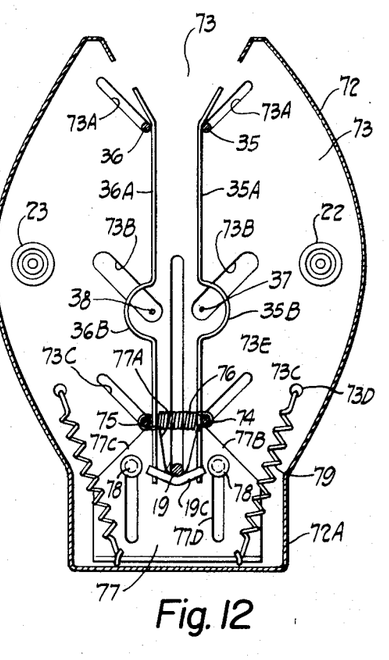
FIGURE 12 is a view similar to that of FIGURE 11 but showing the bread rack in its lower or toasting position.

In FIGURES 11 and 12, there is illustrated a modified structural arrangement for bringing the guard members 35 and 36 inwardly toward the bread automatically as the rack 19 is lowered to toasting position and moves the guard members outwardly away from the bread as the rack 19 is raised to non-toasting position. In the modification of FIGURES 11 and 12, the shell 14 has been modified to the shell indicated by reference character 72. This modified shell 72 has internal opposite reflective sides disposed in a hyperbolic curve similar to that shown and described in the preferred form of shell 14. The shell 72 is modified in that it has a lower portion 72A extending downwardly therefrom for accommodating movement of similar camming members 77 therein at its opposite ends. A camming member 77 is disposed at the opposite ends of the toaster adjacent the supporting panels but for purposes of illustration, the opposite end portions of the toaster are not illuctrated in FIGURES 11 and 12, these opposite end portions being similar in construction to that of the preferred form of toaster shown and described in connection with FIGURES 1 to 10.

The upright supporting panel shown in FIGURES 11 and 12 is denoted by the reference character 73, which panel 73 has inclined slots 73A for accommodating the two horizontal bars of the respective guard members 35 and 36. The guard members 35 and 36 in the modified form of FIGURES 11 and 12 have their lower ends joined by horizontal bars 74 and 75, respectively, which are rigidly connected to the several upright guard portions 35A and 36A. The upright supporting panel 73 is also provided with inclined slots 73B for accommodating the sensor wires 37 and 38 as they move with the guard members inwardly and outwardly relative to the bread in the well of the toaster. There is a similar upright supporting panel 73 at the opposite end of the shell 72 having corresponding slots for accommodating the guard members and sensor wires. Also provided in the upright supporting panels 73 are two inclined slots 73C for accommodating the lower horizontal bars 74 and 75 secured to the lower ends of the respective guard members.

Interconnecting the horizontal bars 74 and 75 at the opposite ends of the shell 72 are coil springs 76 so biased as to urge the bars 74 and 75 toward each other and thus to resiliently urge the guard members 35 and 36 toward each other. The inclined edges of the slots 73A, 73B and 73C are such that upon the guard members 35 and 36 being drawn toward each other and hence toward the bread to be toasted, they are also drawn downwardly so as to be contacting or in very close proximity to the bread therebetween resting in toasting position on the rack 19 in its lowermost or toasting position. The inclined edge of these slots is such as to cause the guard members 35 and 36 to move upwardly as they move away from each other.

The two camming members 77 at the opposite ends of the shell 72 are disposed to move in upright planes. Coil springs 79 connected to the bottom edge of the camming members 77 and to anchor holes 73D in the panels 73 are so interconnected and biased as to resiliently urge the camming members 77 upwardly, as to the position illustrated in FIGURE 11. Each camming member 77 has oppositely inclined camming surfaces 77B and 77C which are inclined toward each other. These inclined camming surfaces 77B and 77C are directed to cammingly engage the horizontal bars 74 and 75 secured to the guard members 35 and 36. Upon the camming members 77 moving upwardly, the bars 74 and 75 are cammingly moved upwardly and outwardly by the surfaces 77B and 77C. Upon the camming members 77 moving downwardly, then the bars 74 and 75 may move inwardly toward each other under the urging of springs 76. There is a central recess 77A extending downwardly from the upper edge of each of the camming members 77 for accommodating the rack 19 and permitting the rack 19 to move downwardly in guiding slots 73E provided therefor. The rack 19 is shown in its upper position in FIGURE 11 and in its lower position in FIGURE 12. For guiding the up and down movement of the camming members 77, there are provided guide pins 78 movable in the two spaced slots 77D in the respective camming members 77.

The length of the recess 77A in the camming members 77 is such that the rack 19 when moved downwardly in the toaster, as for example, by the arm 24 shown in FIGURE 2, moves downwardly in the recess 77A to a point where the rack 19 engages the camming members 77 and thus presses the camming members 77 downwardly from their upper position illustrated in FIGURE 11 to their lower position illustrated in FIGURE 12. This forced downward movement of the camming members 77 by the downward movement of the rack 19 to its lower or toasting position overcomes the resilient bias of the springs 79 to permit the downward movement of the camming members 77 and at the same time the bars 74 and 75 are pulled toward each other by the resilient bias of the spring 76 so that simultaneously as the rack 19 moves downwardly, the guard members 35 and 36 carrying the sensor wires 37 and 38 move downwardly and inwardly firmly against or in very close proximity to the opposite cut sides of the bread carried on the rack 19 to be toasted by the electrical heating elements 22 and 23. The balance of the tension of the springs 79 relative to the tension of the spring 76 is such that the camming members 77 are normally in their upward position shown in FIGURE 11 until moved downwardly by the rack 19. Upon the rack 19 being held downwardly, such as by the magnetic attraction of the magnet 32 on the armature 33 shown in FIGURE 2, the parts are held in the position shown in FIGURE 12. Upon the raising of the rack 19, then the parts resume the position shown in FIGURE 11. The arrangement illustrated provides for quick and convenient means of bringing the guard members and particularly the sensor wires quickly and closely against the bread placed in the toaster as the rack is moved downwardly to toasting position.

Figure 13:
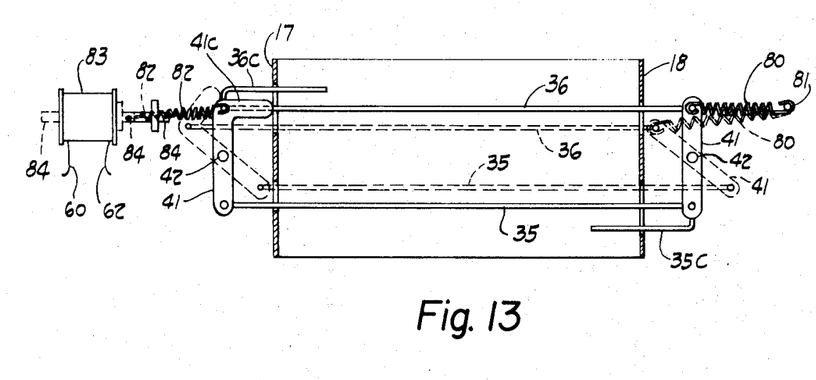
FIGURE 13 illustrates a view showing the electrical operation of the guard members utilized in our device and is somewhat similar to that of FIGURE 7 which shows an arrangement for manual operation of the guard members.

A modified arrangement for moving the guard members toward and away from each other is illustrated in FIGURE 13. Instead of having the respective guard members move toward each other by manual manipulation of the handle 44 as described in connection with FIGURES 6 and 7, there is provided electrical solenoid means for manipulating or swinging of the crossbars 41. On the right-hand side shown in FIGURE 13, the right-hand crossbar 41 is connected at one of its ends through a coil spring 80 to an anchor 81 which is secured to the housing of the toaster. The bias of the spring 80 is such as to urge the guard members to their expanded or spaced apart position shown in full lines in FIGURE 13. The left-hand crossbar 41 has secured thereto a short coil spring or flexible link 82 which has its other end connected to a movable armature 84 actuated by an electrical solenoid coil 83. The armature 84 is disposed to move axially of the coil 83 and to the left in the FIGURE 13 upon energization of the solenoid 83. The solenoid 83 is electrically connected with wires 60 and 62 of the electrical circuit of the toaster so that upon the energization of the heating elements in the circuit, the solenoid 83 is energized so as to move the armature 84 axially thereof toward the left. Movement of the armature 84 to the left tends to pull through the linkage provided by coil spring 82 upon one end of the left-hand crossbar 41 and thus to swing the guard members toward each other to the positions illustrated in broken lines in FIGURE 13. The coil spring 82 has less resilient pull than does the coil spring 81 and in effect provides a flexible linkage between the armature 84 and the left-hand crossbar 41. By means of the modified arrangement shown in FIGURE 13, the guard members 35 and 36 carrying the sensor wires 37 and 38 are automatically moved inwardly toward each other and against the bread being toasted upon the toaster being energized for a toasting cycle. Upon the eltctrical energization of the toaster, including the solenoid 83 so connected as to be actuated upon energization of the electrical circuit, the energizing of the heating elements 22 and 23 takes place. The arrangement shown and described is such as to automatically adjust for different thicknesses of bread slices that may be placed in the well of the toaster for toasting.

By the use of our invention, bread or the like may be toasted faster, the toasting or browning more evenly distributed, and the toasting or browning done more precisely to the degree desired, than with the use of prior devices. The described objects of the invention are obtained with efficiency and economy.

The present disclosure includes that contained in the appended claims, as well as that of the foregoing description.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention as hereinafter claimed.

What is claimed is:

1. A toaster for bread and the like comprising the combination of a supporting structure adapted to accommodate a piece of bread or the like to be toasted, a rack member carried by the supporting structure and guided thereby to be moved between toasting position and non-toasting position, said rack member being adapted to support a said piece of bread or the like and to carry it between said toasting and non-toasting positions, electrical resistance heating means carried by the supporting structure in juxtaposition to said toasting position for toasting said piece of bread or the like supported on the rack member in said toasting position, said rack member being biased toward said non-toasting position, an armature piece carried by said rack member and movable therewith, a magnet carried by said supporting structure in position to face said armature piece and magnetically oriented to magnetically attract and retain said armature thereto upon the rack member being moved to toasting position and thereby retain the rack member against the bias thereof in toasting position, first electrical coil means disposed in juxtaposition to said magnet to oppose, upon electrical energization of the coil, the magnetic attraction of said magnet for said armature and the retention thereof and thereby permit the rack member carrying said armature to move toward non-toasting position, sensing means carried by said supporting structure in juxtaposition to said rack member in toasting position to sense the temperature of a said piece of bread or the like being toasted in said toasting position by said electrical resistance heating means, a switch mechanism biased toward one of two alternate positions, second electrical coil means disposed in juxtaposition to said switch mechanism to oppose the bias thereof and to operate the same to the other of said alternate positions upon energization of the second electrical coil means, said second electrical coil means being positioned to be subjected substantially less than said sensing means to the temperature of a said piece of bread or the like in said toasting position, said second electrical coil means having a substantially greater electrical resistance than the electrical resistance of the said sensing means at non-toasting temperature ranges, said second electrical coil means having a substantially lesser electrical resistance than the electrical resistance of the said sensing means at toasting temperature ranges, and electrical circuit means carried by the said supporting structure adapted to be connected to a source of electrical energy, said circuit means interconnecting said switch mechanism and said first electrical coil means to cause energization of the same upon operation of the said switch mechanism to said other alternate position of the switch mechanism, said circuit means interconnecting said sensing means and said second electrical coil means to cause energization of said second coil means upon energization of the second electrical coil means upon increase of the electrical resistance of the sensing means relative to the electrical resistance of the second coil means by an increase in the temperature of the sensing means sufficient to reverse the ratio of the relative resistances of the sensing means and the second coil means, said circuit means being connected to said electrical resistance means for the energization of the same.

2. A toaster as claimed in claim 1 and in which said sensing means has a higher thermal coefficient of electrical resistance than said second electrical coil means.

3. A toaster as claimed in claim 1 and including adjusting means for adjusting the relative positions of said switch mechanism and said second electrical coil means to adjustable vary the condition at which said switch mechanism operates to said alternate position in response to the energization of said second electrical coil means in accordance with the temperature fo said sensing means.

4. A toaster as claimed in claim 1 and including control means responsive to movement of said rack member between toasting and non-toasting positions to control supply of current through said circuit means to said electrical resistance heating means.

5. A toaster as claimed in claim 1 and in which said magnet is a permanent magnet and in which said first electrical coil means is disposed thereabout to suppress the inherent polarity of said permanent magnet to release the magnetic attraction for said armature.

6. A toaster for bread or the like comprising in combination, electrical heating means for toasting bread or the like in a toasting position, rack means for carrying said bread or the like between alternate toasting and non-toasting positions, sensing means positioned to be subjected to substantially the temperature of said bread or the like carried by the rack means at toasting position, magnetic means for holding said rack means at one of said alternate positions, biasing means urging said rack means toward the other of said alternate means, first electrical coil means associated with the magnetic means for overcoming the hold of said magnetic means on the rack means upon the energization of the first electrical coil means and thereby permitting the rack means to be moved by said biasing means to the other of said alternate positions, normally open switch means in electrical circuit with said first electrical coil means to cause energization of first electrical coil means upon closing of the first swtich means, second coil means associated with said switch means and disposed to control the closing of the switch means by energization of the second electrical coil means, the said second electrical coil means being in electrical circuit with said sensing means to cause current to flow in the second electrical coil means in reverse proportion to flow of current in said sensing means, said second electrical coil means being positioned to be relatively less subjected than the sensing means to the temperature of said bread or the like carried by the rack means in toasting position, the electrical resistances of said sensing means and said second electrical coil means being so proportioned that at relatively low temperatures of said bread or the like carried by the rack means in toasting position electric current passes through the sensing means more than through the second electrical coil means and at relatively high temperatures of said bread or the like carried by the rack means in toasting position electric current passes through the second electrical coil means more than through the sensing means whereby energization of the second electrical coil means is controlled by the temperature of said bread or the like to which said sensing means is subjected, electrical heating means for toasting bread or the like carried by the rack means in toasting position, and electrical circuit means adapted to be connected to a source of electrical energy for supplying electric current to said heating means, sensing means, first electrical coil means and second electrical coil means, said rack means being moved by the biasing means and held by the magnetic means in accordance with the energization of the first electrical coil means by the closing of the first switch means as controlled by the energization of the second electrical coil means.

7. A toaster as claimed in claim 6 and in which said sensing means has a thermal coefficient of electrical resistance higher than that of the second electrical coil means.

8. A toaster as claimed in claim 6 and including adjusting means for adjusting the relative positions of said switch means and said second electrical coil means to adjustably vary the condition at which said switch means operates to closed position in response to energization of the second electrical coil means.

9. A toaster is claimed in claim 6 and including control means responsive to the positioning of the rack means in said alternate toasting and non-toasting positions to control supply of current through said electrical circuit means to said electrical heating means.

10. A toaster as claimed in claim 6 and in which said magnetic means includes a permanent magnet and in which said first electrical coil means is disposed thereabout to suppress the inherent polarity of said permanent magnet.

11. In a toaster for bread or the like, the combination of movable rack means for carrying said bread or the like between toasting and non-toasting positions, electrical heating means for toasting the said bread or the like in toasting position, biasing means for moving said rack means toward one of said positions, magnetic means for holding the rack means in opposition to said biasing means in the other of said positions, sensing means positionable in close proximity to the bread or the like carried by the rack means in toasting position for sensing the temperature of the said bread or the like, and electrical control means operatively interconnecting said sensing means and said magnetic means for controlling the degree of the hold of the magnetic means on said rack means in accordance with the temperature of the said bread or the like as sensed by said sensing means.

12. The combination as claimed in claim 11 and in which said electrical control means include a first electric coil associated with the magnetic means and disposed for governing the magnetic attraction provided thereby, a reed switch in electrical circuit with the first electric coil for controlling for energization thereof, and a second electric coil associated with the reed switch and disposed for governing the operation of the switch by magnetic flux produced by the second electric coil upon energization thereof, said second electric coil being in electrical circuit with said sensing means and having an electric resistance substantially greater than the electric resistance of the sensing means at normal room or non-toasting temperature, said second electric coil being disposed thermally remote from said sensing means to be relatively unaffected by toasting temperature of the bread or the like sensed by said sensing means, and sensing means having an electric resistance substantially greater than the electrical resistance of the second electric coil at toasting temperature of the said bread or the like, the flow of current in the second electric coil being controlled by the relative resistances of the sensing means and second electric coil as determined by the temperature of the sensing means.

13. The combination as claimed in claim 12 and in which one of said reed switch and said second electric coil is movable relative to the other to adjustably vary the condition under which the reed switch operates in response to energization of the second electric coil and thereby determine the degree of temperature of the sensing means required for operation of the electric control means.

14. The combination as claimed in claim 11 and in which said magnetic means includes a magnet having a polarity arranged for holding the rack means in said other position and said electrical control means includes an electric coil disposed adjacent said magnet to reverse or cancel the polarity of the magnet upon energization of the electric coil and thereby release the hold of the magnetic means on the rack means.

15. In a toaster having a rack for carrying bread or the like between toasting and non-toasting positions and electrical heating means positioned to toast the bread or the like in toasting position, the combination of movable guard means positioned in generally upright planes on opposite sides of bread or the like carried by the rack, temperature sensing elements carried by said guard means on opposite sides of the bread or the like carried by the said rack and positionable in close proximity to the bread or the like to sense the temperature of the same in toasting position, each of said sensing elements being disposed relative to a side of said bread or the like to be generally responsive to the mean temperature of the bread or the like on said side thereof, said movable guard means being formed to accommodate said sensing elements, said sensing elements being adapted to control the toasting of said bread or the like, and operating means for moving said guard means and sensing elements carried thereby toward and away from the opposite sides of bread or the like carried by said rack in toasting position whereby the bread or the like is held upright by the guard means and the sensing elements are moved against or in close heat-sensing proximity to the bread or the like upon movement by the operating means of the guide means and sensing elements carried thereby toward the bread or the like in toasting position.

16. The combination claimed in claim 15, and including power means in electrical circuit with the electrical heating means and responsive to energization thereof for automatically operating said operating means to move the guard means and sensing wires carried thereby toward said opposite sides of said bread or the like carried by the rack in toasting position upon energization of the electrical heating means and to move the guard means and sensing wires carried thereby away from said opposite sides of said bread or the like carried by the rack in toasting position upon de-energization of the electrical heating means.

17. The combination claimed in claim 15 and including means responsive to the temperature sensed by said sensing elements for holding the rack in toasting position until the sensing element senses a predetermined temperature of said bread or the like and releases the rack from said toasting position to permit it to move to non-toasting position upon the sensing element sensing such predetermined temperature of the bread or the like.

18. The combination claimed in claim 15 and including first means for moving the rack to non-toasting position, second means for holding the rack in toasting position, third means for releasing the second means to permit the rack to be moved to non-toasting position by the first means, and fourth means responsive to the temperature sensed by said sensing elements for operating said third means upon the sensing elements sensing a predetermined temperature in the toasting of said bread or the like to cause the rack to move the bread or the like to non-toasting position.

19. The combination claimed in claim 15 and including first solenoid means for holding the said rack in toasting position, second solenoid means for moving the said operating means, first electric control means responsive to the temperature of said sensing elements for controlling the operation of said first solenoid means, and second electric control means responsive to energization of said electric heating means for controlling the operation of said second solenoid means.

20. Apparatus for controlling the cooking of food comprising the combination of a heat sensing element adapted to be positioned in such proximity to the food being cooked as to assume substantially and sense the temperature of said food, electrical heating means for cooking said food, a first electrical circuit adapted to be connected to a source of electrical energy for energizing said heating means, first electric relay means, switch means in said first electrical circuit controlled by said first relay means for controlling flow of current in said first electrical circuit, a second electrical circuit electrically connected to said first electrical circuit and electrically connected to said first electric relay means, second relay means in said second electrical circuit for controlling flow of current in said second electrical circuit, said second electric relay means being thermally remote from said sensing element so as to be substantially less affected by the temperature of the said food than said sensing element, and a third electrical circuit connected to said first electrical circuit and electrically connected to said heat sensing element and said second electric relay means, said sensing element and said second relay means having such relative electrical resistances that at lower temperatures of the said food the electric resistance of the sensing element is substantially less than the electrical resistance of said second electric relay means whereby electric current is then biased to flow more through said sensing element than through said second relay means, and such that at higher temperatures of the food the electric resistance of the sensing element is substantially greater than the electric resistance of said second relay means whereby electric current is then biased to flow more through said second relay means than through said sensing element, the operation of the second relay means through said third electrical circuit operating said first relay means whereby the switch means is controlled by the temperature of said sensing element.

21. Apparatus as claimed in claim 20 and including rack means for carrying said food between cooking and non-cooking positions and in which movement of said rack means in at least one direction is controlled by operation of said first relay means.

22. Apparatus as claimed in claim 20 and in which said first relay means comprises a magnet, an armature connected to said switch means, and a first coil in said second electrical circuit energizable by electric current in said second electrical circuit arranged whereby energization of the said first coil causes the armature to move said switch means to open position.

23. Apparatus as claimed in claim 20 and in which said second relay comprises a normally open reed switch in said second electrical circuit controlling the flow of current therethrough, and a second coil in said third electrical circuit energizable by electric current biased therethrough in said third electrical circuit by the electrical resistance of said sensing element at higher temperatures of food sensed by said sensing element, whereby energization of the second coil urges said reed switch toward closed position.

24. Apparatus as claimed in claim 23 and including means for varying the relative positions of said reed switch and second coil to adjust the effect of the energization of the coil on the reed switch whereby the point at which the reed switch is closed by energization of the second coil may be predetermined.

25. A toaster for slices of bread or the like, said toaster having a slot for receiving said slices for toasting thereof in an upright plane, said slot having a length greater than the width of two of said slices to accommodate therein a plurality of two or more slices arranged in tandem in said upright plane, the combination of a pair of temperature-sensing elements each disposed on one side of the opposite sides of said slot to sense the temperature of the opposite sides of said slices in the slot, said temperature-sensing elements being disposed intermediate the top and bottom of the slot to sense the temperature of the slices in the slot approximately midway between top and bottom edges thereof said temperature-sensing elements being disposed along substantially the full length of said slot so as to be along side of a lesser number of said slices than said plurality regardless of the position of said lesser number of slices along the length of said slot, a rack member disposed in operative association with said slot and movable downwardly and upwardly relative to said slot for supporting said slices therein and for moving the slices between lower toasting and upper non-toasting positions, guard means disposed in said slot on opposite sides thereof for providing lateral support to slices in said slot, and operating means for moving said guard means simultaneously on both sides of said slot laterally toward said upright plane to embrace said slices upon the said rack member being moved downwardly to lower the slices to toasting position and for moving said guard means simultaneously on both sides of said slot laterally away from said upright plane to remove said embrace of the guard means on said slices upon the said rack member being moved upwardly to raise the slices to non-toasting position.

26. The combination claimed in claim 25 in which said temperature-sensing elements are carried by said guard means to be moved therewith toward and away from the opposite sides of said slices.

27. The combination claimed in claim 26 and in which said rack member is spring-biased upwardly to move upwardly upon being released from its lower position, and including electrically controlled means for releasing said rack member from its lower position and raising said slices to non-toasting position, and in which said temperature-sensing elements are electrically connected to said electrically controlled means for governing the same in accordance with the temperature of said slices as sensed by said temperature-sensing elements.

28. The combination claimed in claim 25 and including electrically energizable infrared elements disposed in horizontal planes on opposite sides of said slot to emanate infrared energy on opposite sides of said slices therein and being disposed substantially along the length of said slots to be disposed alongside the said plurality of slices and also alongside said lesser number of slices regardless of the position of said lesser number of slices along the length of said slot, said infrared elements being disposed between the top and bottom of said slot to emanate infrared energy at about midway between the top and bottom edges of said slices, and reflective surfaces disposed outwardly of said infrared elements on opposite sides of said slot to reflect toward slices in said slot infrared energy from said elements striking said surfaces, said surfaces being curved about centers disposed along lines parallel to the axes of said infrared elements and in the horizontal planes thereof, said surfaces being disposed substantially along the length of said slots to be disposed alongside the said plurality of slices and also alongside said lesser number of slices regardless of the position of the said lesser number of slices along the length of said slot.

29. In a toaster for bread or the like, the combination of movable rack means for carrying said bread or the like between toasting and non-toasting positions, electrical heating means for toasting the said bread or the like in toasting position, biasing means for moving said rack means toward one of said positions, magnetic means for holding the rack means in opposition to said biasing means in the other of said positions, sensing means positionable in close proximity to the bread or the like carried by the rack means in toasting position for sensing the temperature of the said bread or the like, and electrical control means operatively interconnecting said sensing means and said magnetic means for controlling the degree of the hold of the magnetic means on said rack means in accordance with the temperature of the said bread or the like as sensed by said sensing means, said electrical control means including a first electric coil associated with the magnetic means and disposed for governing the magnetic attraction provided thereby, a reed switch in electrical circuit with the first electric coil for controlling for energization thereof, and a second electric coil associated with the reed switch and disposed for governing the operation of the switch by magnetic flux produced by the second electric coil upon energization thereof, said second electric coil being in electrical circuit with said sensing means and having an electric resistance substantially greater than the electric resistance of the sensing means at normal room or non-toasting temperature, said second electric coil being disposed thermally remote from said sensing means to be relatively unaffected by toasting temperature of the bread or the like sensed by said sensing means, said sensing means having an electric resistance substantially greater than the electrical resistance of the second electric coil at toasting temperature of the said bread or the like, the flow of current in the second electric coil being controlled by the relative resistances of the sensing means and second electric coil as determined by the temperature of the sensing means, said reed switch and said second electric coil being movable relative to the other to adjustably vary the condition under which the reed switch operates in response to energization of the second electric coil and thereby determine the degree of temperature of the sensing means required for operation of the electric control means, and said magnetic means including a magnet having a polarity arranged for holding the rack means in said other position and said electrical control means including an electric coil disposed adjacent said magnet to reverse or cancel the polarity of the magnet upon energization of the electric coil and thereby release the hold of the magnetic means on the rack means.

30. In a toaster, the combination of a rack movable to carry bread or the like between toasting and non-toasting positions, electric heating means for toasting the bread or the like in toasting position, movable guard means movable toward and away from the opposite sides of the bread or the like in toasting position, an electric circuit adapted to be connected to a source of electric current for supplying current to the said heating means, an electric switch in said circuit for controlling the same and operative in accordance with the movement of the rack between toasting and non-toasting position, and operating means for moving the guard means toward the bread or the like upon the movement of the rack to toasting position, said operating means including solenoid means energized by the electric current in said circuit upon the operation of said switch in accordance with the movement of the rack to toasting position.

31. In a toaster, the combination of a rack movable to carry bread or the like between toasting and non-toasting positions, electric heating means for toasting the bread or the like in toasting position, movable guard means movable toward and away from the opposite sides of the bread or the like in toasting position, an electric circuit adapted to be connected to a source of electric current for supplying current to the said heating means, an electric switch in said circuit for controlling the same and operative in accordance with the movement of the rack between toasting and non-toasting position, and operating means for moving the guard means toward the bread or the like upon the movement of the rack to toasting position, and temperature sensing means carried by the guard means on opposite sides of said bread or the like to be moved therewith toward and away from the bread or the like, said sensing means being disposed along said guard means to substantially meet the planes of the opposite sides of the bread or the like upon being moved toward the same upon the guard means being moved against said opposite sides of the bread or the like, whereby said sensing means assumes substantially the temperature of said bread or the like at said planes on opposite sides thereof.

32. In a toaster, the combination of a rack movable to carry bread or the like between toasting and non-toasting positions, electric heating means for toasting the bread or the like in toasting position, movable guard means movable toward and away from the opposite sides of the bread or the like in toasting position, an electric circuit adapted to be connected to a source of electric current for supplying current to the said heating means, an electric switch in said circuit for controlling the same and operative in accordance with the movement of the rack between toasting and non-toasting position, and operating means for moving the guard means toward the bread or the like upon the movement of the rack to toasting position, said operating means including means for actuating the operating means in accordance with the movement of the said rack, and said guard means including temperature sensing means movable therewith adapted to control movement of the rack toward non-toasting position upon the sensing means sensing a pre-determined high temperature of the bread or the like toasted at said toasting position.

33. A toaster for slices of bread or the like, said toaster having a slot for receiving said slices for toasting thereof in an upright plane, said slot having a length greater than the width of two of said slices to accommodate therein a plurality of two or more slices arranged in tandem in said upright plane, the combination of a pair of temperature-sensing elements each disposed on one side of the opposite sides of said slot to sense the temperature of the opposite sides of said slices in the slot, said temperature-sensing elements being disposed intermediate the top and bottom of the slot to sense the temperature of the slices in the slot approximately midway between top and bottom edges thereof, said temperature-sensing elements being disposed along substantially the full length of said slot so as to be alongside of a lesser number of said slices than said plurality regardless of the position of said lesser number of slices along the length of said slot, a rack member disposed in operative association with said slot and movable downwardly and upwardly relative to said slot for supporting said slices therein and for moving the slices between lower toasting and upper non-toasting positions, guard means disposed in said slot on opposite sides thereof for providing lateral support to slices in said slot, operating means for moving said guard means simultaneously on both sides of said slot laterally toward said upright plane to embrace said slices upon the said rack member being moved downwardly to lower the slices to toasting position and for moving said guard means simultaneously on both sides of said slot laterally away from said upright plane to remove the said embrace of the guard means on said slices upon the said rack member being moved upwardly to raise the slices to non-toasting position, said temperature-sensing elements being carried by said guard means to be moved therewith toward and away from the opposite sides of said slices, said rack member being spring-biased upwardly to move upwardly upon being released from its lower position, and electrically controlled means for releasing said rack member from its lower position and raising said slices to non-toasting position, said temperature-sensing elements being electrically connected to said electrically controlled means for governing the same in accordance with the temperature of said slices as sensed by said temperature-sensing elements, and including electrically energizable infrared elements disposed in horizontal planes on opposite sides of said slot to emanate infrared energy on opposite sides of said slices therein and disposed substantially along the length of said slots to be disposed alongside the said plurality of slices and also alongside said lesser number of slices regardless of the position of said lesser number of slices along the length of said slot, said infrared elements being disposed between the top and bottom of said slot to emanate infrared energy at about midway between the top and bottom edges of said slices, and reflective surfaces disposed outwardly of said infrared elements on opposite sides of said slot to reflect toward slices in said slot infrared energy from said elements striking said surfaces, said surfaces being curved about centers disposed along lines parallel to the axes of said infrared elements and in the horizontal planes thereof, said surfaces being disposed substantially along the length of said slots to be disposed alongside the said plurality of slices and also alongside said lesser number of slices regardless of the position of said lesser number of slices along the length of said slot.

34. In an electric toaster for bread or the like having a housing, the housing having a slot opening into the housing for accommodating the bread or the like to be toasted, a rack for carrying the bread or the like between toasting position in the slot and non-toasting position, latch means for holding said rack in one of said positions, biasing means for biasing said rack toward the other of said positions, an electric circuit carried by the housing, and electrical heating elements electrically connected to said circuit and disposed on the opposite sides of the slot to toast the bread or the like in toasting position in the slot, the combination of temperature sensing means in said housing and positionable in close proximity to the opposite sides of bread or the like in toasting position in said slot to sense the temperature of said bread or the like, said sensing means having a variable resistance to flow of electric current therethrough dependent in degree upon the temperature sensed by the sensing means, electrically responsive release means for releasing said latch means to cause the rack to be moved by said biasing means upon a predetermined degree of change in electric current supplied to said electrically responsive release means, switch means electrically connected to said circuit and to said release means to control the supply of current to said release means, and electrical control means for controlling the operation of said switch means to change the supply of electric current to said release means, said electric control means having a resistance to flow of electric current therethrough that is greater than the resistance of the sensing means at relatively lower temperatures in the range of room or non-toasting temperatures and less than the resistance of the sensing means at relatively higher temperatures in the range of toasting temperatures, said sensing means and electrical control means being electrically interconnected to each other and with said circuit, the electrical resistances of said sensing means and electrical control means being so proportioned that at said relatively lower temperatures sensed by the sensing means current is biased to flow more through the sensing means than through the electrical control means and at said relatively higher temperatures sensed by the sensing means current is biased to flow more through the electrical control means, the greater flow of current to a required degree in the electrical control means causing the switch means to operate for changing the supply of current to said release means for actuation thereof.

35. The combination claimed in claim 34 and in which said latch means is a magnetic latch, and in which said release means is an electric counter-magnetic means for over-coming the magnetic holding force of the magnetic latch upon a predetermined degree of change in the supply of current to the counter-magnetic means.

36. The combination claimed in claim 34 and in which said switch means is a reed switch susceptible to magnetic force for operation, and said electrical control means is an electric coil positioned and adapted to exert a magnetic force upon the reed switch for the operation of the same.

37. The combination claimed in claim 34 and including adjusting means for adjustably varying the relative positions of the switch means and electrical control means to adjustably determine the value of the flow of electric current therethrough required for operation of said switch means by the electrical control means.

38. The combination claimed in claim 36 and including adjustable means for adjustably varying the relative positions of the said reed switch and said electric coil to adjustably determine the value of the flow of electric current therethrough to exert the required magnetic force to operate the said reed switch by the said magnetic force.

39. The combination claimed in claim 35 and including adjusting means for adjustably varying the relative positions of the switch means and electrical control means to adjustably determine the value of the flow of electric current therethrough required for operation of said switch means by the electric control means.

40. The combination claimed in claim 34, in which said latch means is a magnetic latch, and said release means is an electric counter-magnetic means for overcoming the magnetic holding force of the magnetic latch upon a predetermined change in the supply of current to the counter-magnetic means, in which said switch means is a reed switch susceptible to magnetic force for operation in which said electrical control means is an electric coil positioned and adapted to exert a magnetic force upon the reed switch for operation of the same, and including adjustable means for adjustably varying the realtive positions of the said reed switch and said electric coil to adjustably determine the value of electric current therethrough to exert the required magnetic force to operate the said reed switch by the said magnetic force.

References Cited

UNITED STATES PATENTS

| | | | |
|---|---|---|---|
| 1,596,081 | 8/1926 | Coleman | 99—391 X |
| 1,963,409 | 6/1934 | Johnson | 99—391 |
| 2,025,898 | 12/1935 | Rhodes | 99—401 X |
| 2,194,859 | 3/1940 | Malmquist et al. | 99—328 |
| 2,355,153 | 8/1944 | Gomersall | 99—391 |
| 2,491,829 | 12/1949 | Palmer et al. | 99—391 |
| 2,597,023 | 5/1952 | Olving | 99—326 |
| 2,838,989 | 6/1958 | Clark et al. | 99—401 |
| 2,865,279 | 12/1958 | Palmer | 99—329 |
| 2,910,929 | 11/1959 | Sorenson | 99—390 |
| 2,951,436 | 9/1960 | Hild et al. | 99—391 |
| 3,298,300 | 1/1967 | Grebow et al. | 99—337 |

BILLY J. WILHITE, *Primary Examiner.*

UNITED STATES PATENT OFFICE
CERTIFICATE OF CORRECTION

Patent No. 3,358,584                              December 19, 1967

Earl E. Sutton et al.

It is hereby certified that error appears in the above numbered patent requiring correction and that the said Letters Patent should read as corrected below.

Column 1, line 40, for "each" read -- such --; column 2, line 16, after "downward" insert -- or --; line 55, for "of the tubular" read -- of the two tubular --; line 57, after "practical" insert -- maximum --; column 3, line 18, for "thus extend" read -- thus to extend --; line 45, for "mountetd" read -- mounted --; column 4, line 1, for "directly" read -- directed --; column 4, line 75, for "36B" read -- 36A --; column 9, line 29, for "illuctrated" read --illustrated --; column 11, line 11, for "eltctrical" read -- electrical --; column 12, line 29, for "adjustable" read -- adjustably --; line 32, for "fo" read -- of --; column 16, line 15, for "thereof said" read -- thereof, said --; line 36, for "25 in" read -- 25 and in --; line 70, for "of the said" read -- of said --; column 20, line 43, for "realtive" read -- relative --.

Signed and sealed this 29th day of April 1969.

(SEAL)
Attest

EDWARD M. FLETCHER, JR.                        EDWARD J. BRENNER
Attesting Officer                                Commissioner of Patents